US009242245B2

(12) United States Patent
Kolodkin et al.

(10) Patent No.: US 9,242,245 B2
(45) Date of Patent: Jan. 26, 2016

(54) SAMPLE PROCESSING DEVICE

(75) Inventors: Alex Leo Kolodkin, Baltimore, MD (US); Terry Harrison Shelley, Glen Rock, PA (US); Shih-Hsiu Wang, Baltimore, MD (US); Ivana Celic, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 979 days.

(21) Appl. No.: 13/497,871

(22) PCT Filed: Sep. 21, 2010

(86) PCT No.: PCT/US2010/049655
§ 371 (c)(1),
(2), (4) Date: May 3, 2012

(87) PCT Pub. No.: WO2011/037920
PCT Pub. Date: Mar. 31, 2011

(65) Prior Publication Data

US 2012/0208207 A1 Aug. 16, 2012

Related U.S. Application Data

(60) Provisional application No. 61/244,939, filed on Sep. 23, 2009.

(51) Int. Cl.
*G01N 1/30* (2006.01)
*B01L 3/00* (2006.01)

(52) U.S. Cl.
CPC ..... *B01L 3/50255* (2013.01); *B01L 2300/0851* (2013.01)

(58) Field of Classification Search
USPC ........... 422/549, 551, 552, 561, 562; 436/809
See application file for complete search history.

(56) References Cited

U.S. PATENT DOCUMENTS 5,916,526 A 6/1999 Robbins
6,193,892 B1 * 2/2001 Krueger et al. ............... 210/695
2009/0129990 A1 5/2009 Kokawa et al.

FOREIGN PATENT DOCUMENTS

JP 08-052336 2/1996
JP 11-089554 4/1999

OTHER PUBLICATIONS

Corning product insert, Transwell Permeable Supports, 2006.*

* cited by examiner

*Primary Examiner* — Chris L Chin
(74) *Attorney, Agent, or Firm* — Johns Hopkins Technology Transfer

(57) ABSTRACT

A floating chamber set may include a plurality of containers coupled to a frame such that each container translates vertically within a limited vertical range independent of the other containers. Each container may be perforated to allow liquid penetration.

12 Claims, 7 Drawing Sheets

SAMPLE PROCESSING DEVICE

CROSS-REFERENCE TO RELATED APPLICATIONS

This application is a 35 U.S.C. §371 U.S. national entry of International Application PCT/US2010/049655 having an international filing date of Sep. 21, 2010, which claims the benefit of U.S. Provisional Application No. 61/244,939, filed Sep. 23, 2009, the content of each of the aforementioned applications is herein incorporated by reference in their entirety.

BACKGROUND

Trays with multiple wells can be used for simultaneously exposing multiple tissue samples to liquids. A sample may be held in a perforated container which is then mated with a well in order to expose the tissue to the liquid. In order to facilitate exposure of multiple (6, 12, 24, 96, etc.) samples simultaneously, multiple containers may be attached to one another. Enough liquid must be present in each well to treat each sample. When such containers are rigidly attached, variations on in the depth of the well or the depth of the containers may prevent the very bottom of the container from seating in the very bottom of the well. If the sample happens to come to rest at the very bottom of the well, then only a minimum of liquid is needed to fully immerse the sample. But if the sample comes to rest anywhere above the bottom of the well, additional liquid will be required to fully immerse the sample.

SUMMARY

A floating chamber set may include a plurality of containers coupled to a frame such that each container translates vertically within a limited vertical range independent of the other containers. Each container may be perforated to allow liquid penetration.

DETAILED DESCRIPTION

Figure 1:
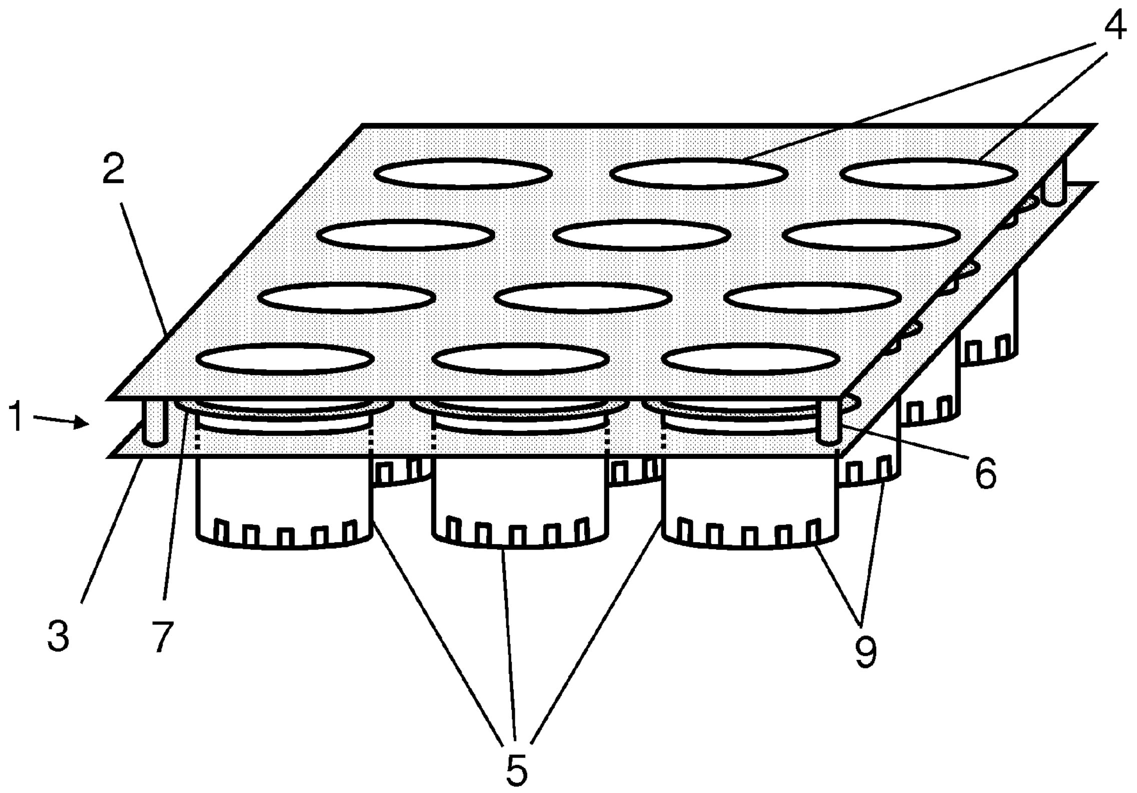
FIG. 1 depicts an embodiment including a frame with two horizontal plates.

In some embodiments, the device includes a plurality of containers coupled to a frame. The containers may translate vertically relative to the frame, and the frame limits the vertical translation range of each container. Each container may translate independent of the other containers. Each container may also be perforated to allow liquid penetration. Ranges of the limited vertical movement include from 0.5 millimeters (mm) up to 3 mm of vertical throw, although smaller and larger ranges are possible, such as 0.5 mm to 2 mm, 0.5 mm to 1.5 mm, 0.5 mm to 1 mm, 1 mm to 2 mm, 0.2 mm to 3 mm, and 0.2 mm to 3.5 mm. In addition to limiting the vertical throw of the containers, the frame may also confine the containers horizontally relative to the frame. The frame may substantially prevent the containers from horizontally translating relative to the frame at all.

In some embodiments, the frame 1 includes one or more horizontal plates 2, 3 as shown in FIGS. 1, 2, 3 and 4. The plate may define a plurality of openings 4, each opening sized and shaped to receive one of the containers 5. Each container may then occupy one of the openings 4. If the openings 4 are sized just large enough to receive the containers 5, then the frame 1 will largely prevent horizontal translation of the containers 5 relative to the frame 1. Other embodiments are possible in which the frame limits or confines the horizontal translation of the containers relative to the frame but without substantially preventing horizontal translation. In some embodiments, horizontal translation may be preferable, for example, if containers horizontal position needs to be adjusted to properly engage with the wells of an underlying multi-well tray.

In some embodiments, the frame 1 will include two horizontal plates 2, 3. The horizontal plates 2, 3 could be similar or identical, with matching openings, as shown in FIG. 1. In that particular embodiment, the lower plate 3 defines openings 4 that are traversed by the containers 5, while the upper plate defines openings 4 that allow access into the containers. A user might then deposit samples in the containers 5 through the openings 4 in the upper plate 2. A two-plate frame could be made by attaching two separate plates together, or by integrally forming the frame so as to include the two plates. Separate plates could be attached by mechanical means, such as screws or an interference fit, or by adhesives or any other method known in the art. In the embodiment shown in FIG. 1, the plates 2, 3 are attached to one another and spaced apart from one another by posts 6 located in the corners of the plates. Plates 2, 3 could be attached to one another at other locations, for example scattered over the entire area of the plates for better support. Separate plates could be permanently attached, or could be attached by a user, e.g., one plate could snap-fit onto the other. This last approach may be especially useful if upper plate 2 lacks openings (or at least lacks openings in register with openings in the lower plate) and instead serves as a protective lid; the containers would initially rest in lower plate 3, the user would add samples to the containers, and then the user would attach the upper plate to the lower plate, both to protect the samples from contamination and to limit vertical excursion of the containers.

Figure 2:
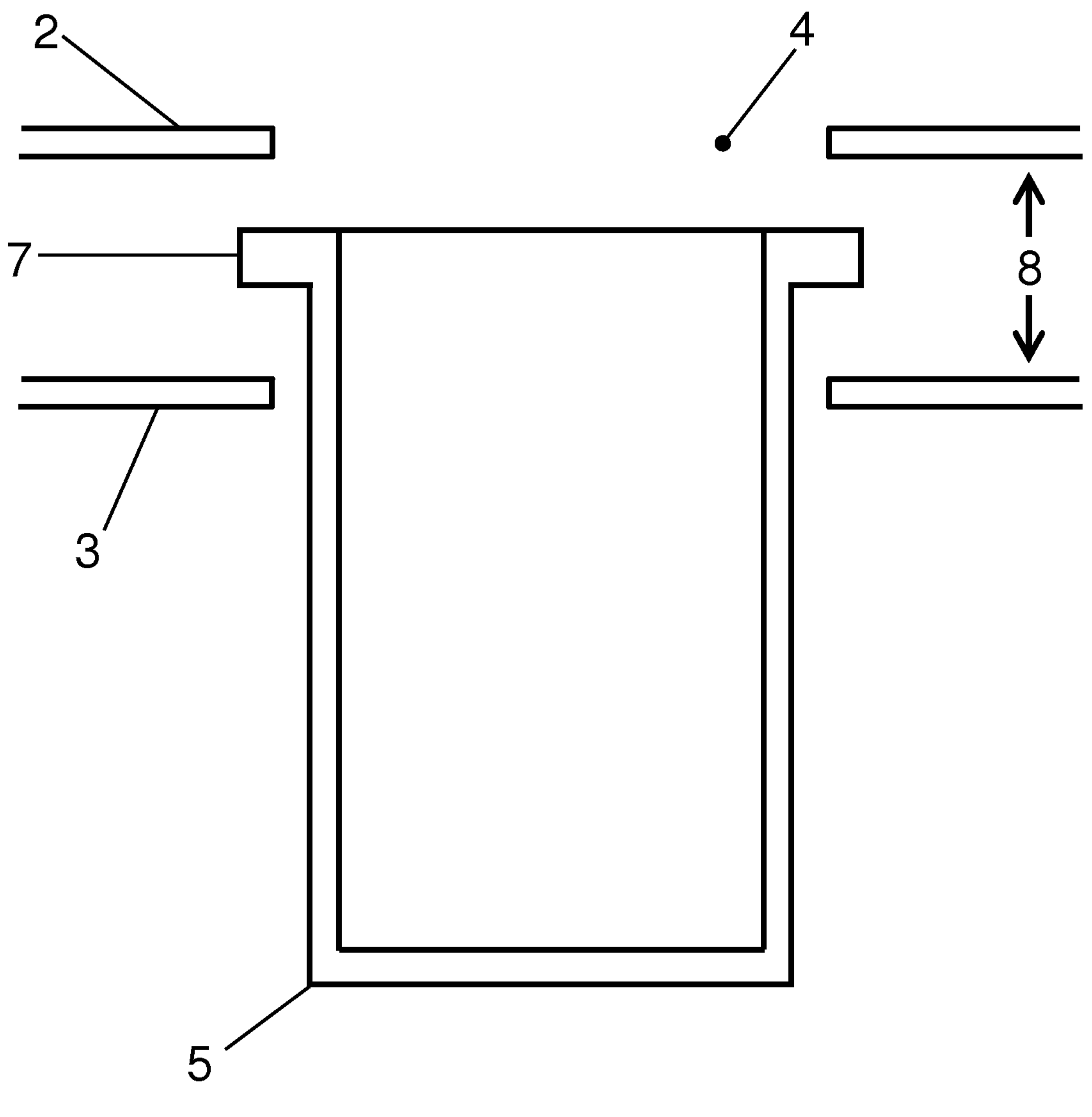
FIG. 2 depicts the containers of the embodiment shown in FIG. 1.

As shown in FIG. 2, the two plates 2, 3 are spaced apart so that the distance between the two plates 2, 3 defines the limited vertical range 8 of vertical translation of each container relative to the frame. In this embodiment, each container includes a shoulder 7 that is sized and shaped so that the shoulder 7 does not fit through the openings 4 in the plates 2, 3. In this way, the shoulders 7 are trapped between the plates 2, 3 limiting the vertical range of motion of the container 5 relative to the frame 1.

Figure 3:
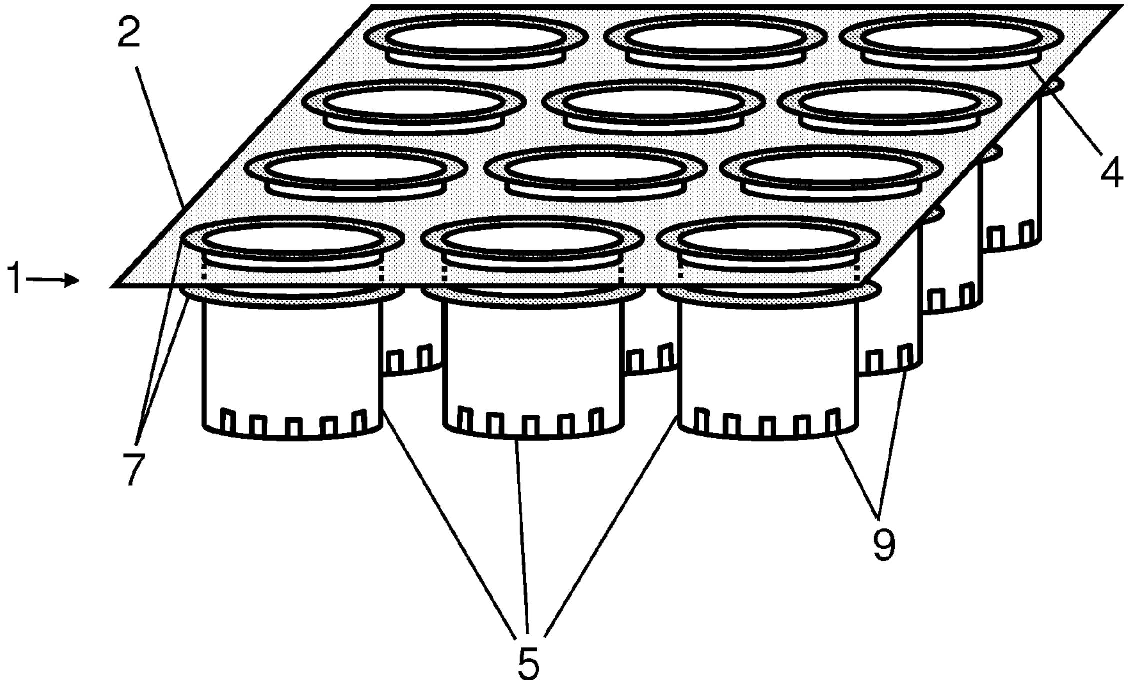
FIG. 3 depicts an embodiment including a frame with only one horizontal plate.
Figure 4:
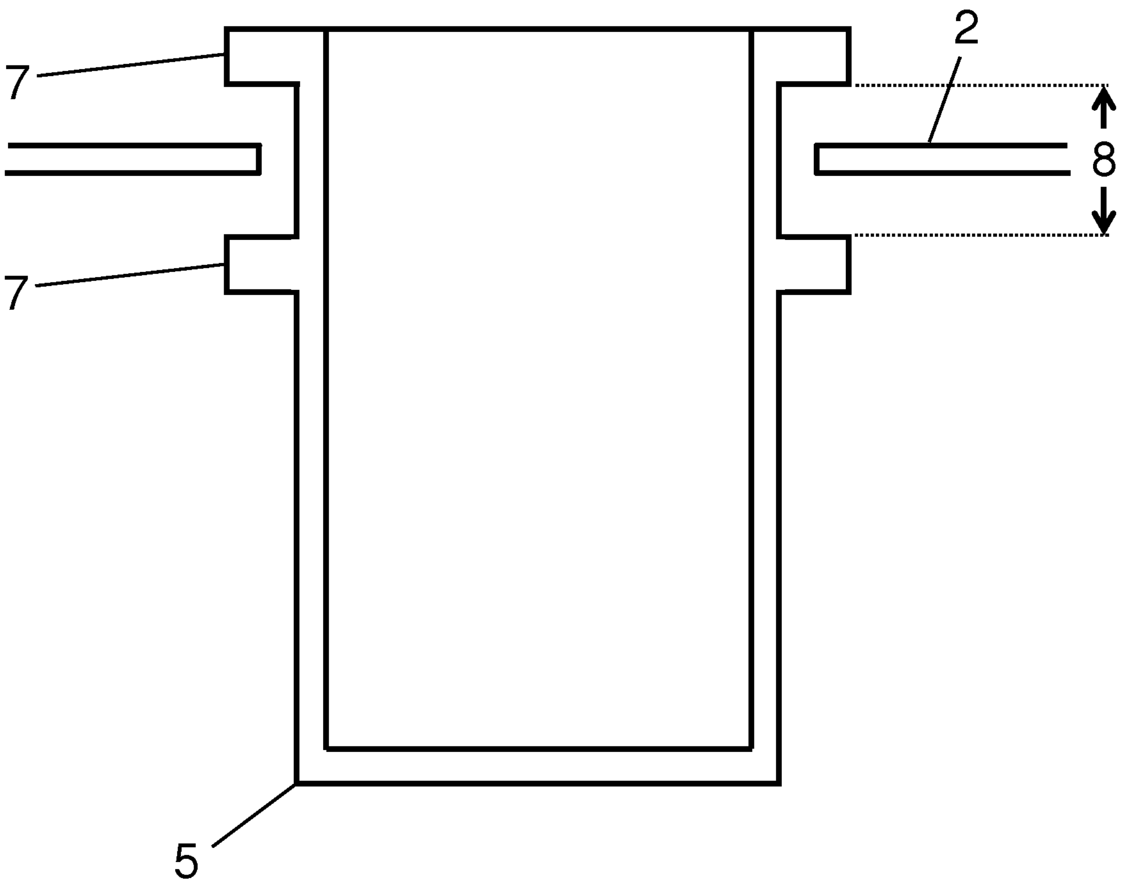
FIG. 4 depicts the containers of the embodiment shown in FIG. 3.

In other embodiments, as shown in FIG. 3, the frame 1 may include only one plate 2. In such embodiments, the containers 5 will still occupy openings 4 defined by the plate 2. But instead of the containers having a shoulder trapped between two plates, the plate 2 will be trapped between two shoulders 7. As shown in FIG. 4, a container 5 may have two shoulders 7 vertically spaced apart by a distance 8. The vertical spacing of the shoulders 7 in this embodiment defines the limited vertical range of vertical translation of each container 5 relative to the frame 1. Because the shoulders 7 are sized and shaped so that they cannot pass through the opening 4 in the plate 2, each container 5 traps the plate 1 between its shoulders 7.

The number and arrangement of containers is variable and may be made to fit any desired multi-well tray. Typical numbers of containers in the device and wells in the tray are 6, 8, 12, 24, 48 or 96, but any number of containers and wells is possible.

Figure 5:
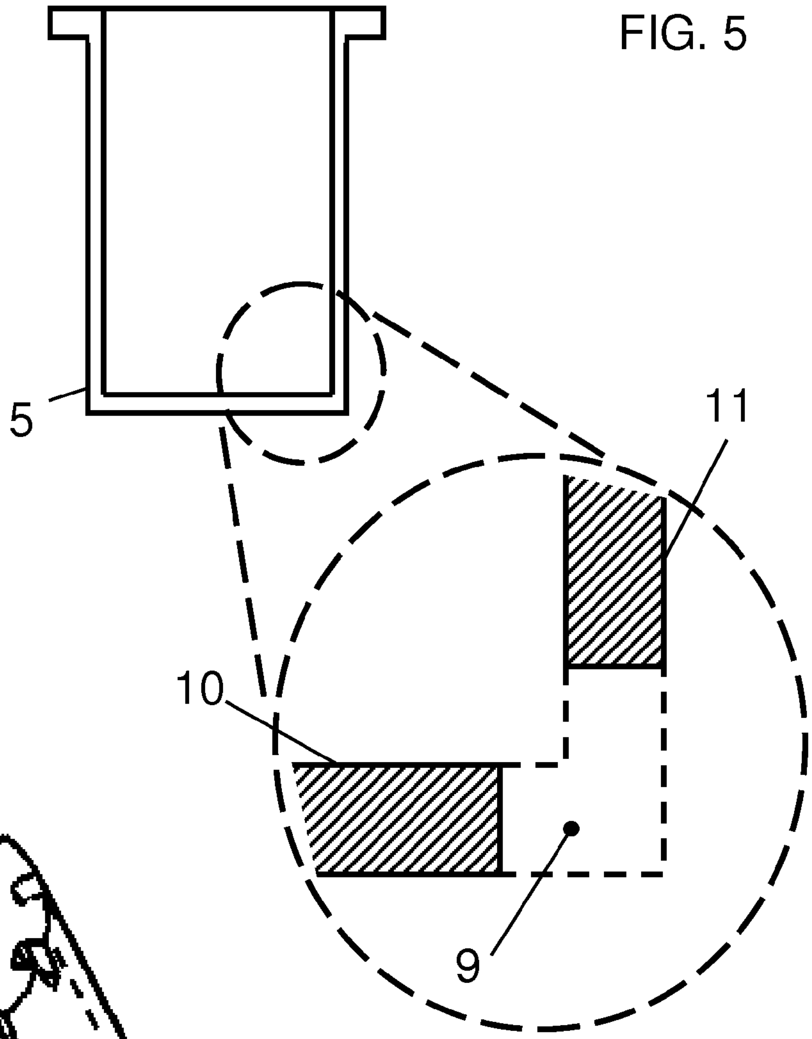
FIGS. 5 and 5A depict examples of perforations in the containers.
Figure 5A:
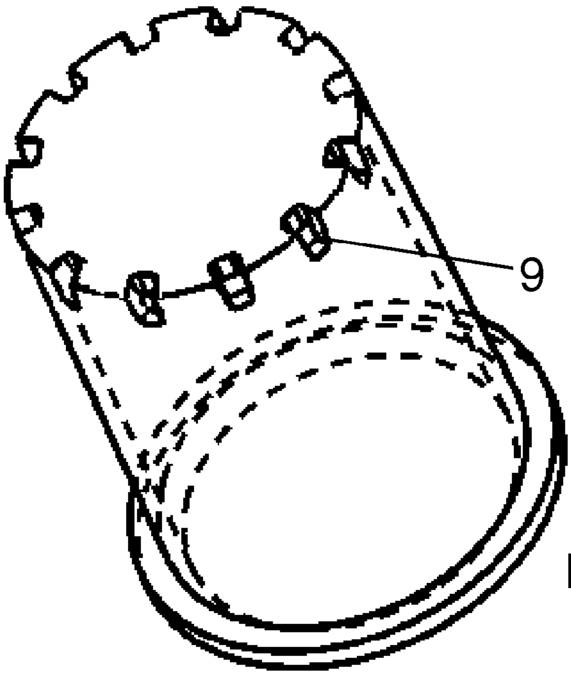

A wide variety of shapes, sizes and arrangements of perforations will allow for liquid penetration. If the container includes either a horizontal base or a vertical wall, either or both may define perforations. FIGS. 5 and 5A depict one exemplary configuration of perforations 9 in a container 5 to allow liquid penetration. As shown, the container 5 defines perforations 9 (shown in dashed lines) where its horizontal base 10 and vertical sides 11 meet, the openings 9 having both vertical and horizontal extent. A preferred size for such perforations is about 1 millimeter, and in some embodiments the perforations could range from 0.1 millimeters to 2 millimeters in size, but larger or smaller perforations are also possible. The perforations could also take the form of a net, mesh or sieve, which could form all or part of a horizontal base of a container. However the perforations are defined, they should be sized, shaped, and positioned in the container to allow liquid entry and to prevent sample escape.

Figure 6:
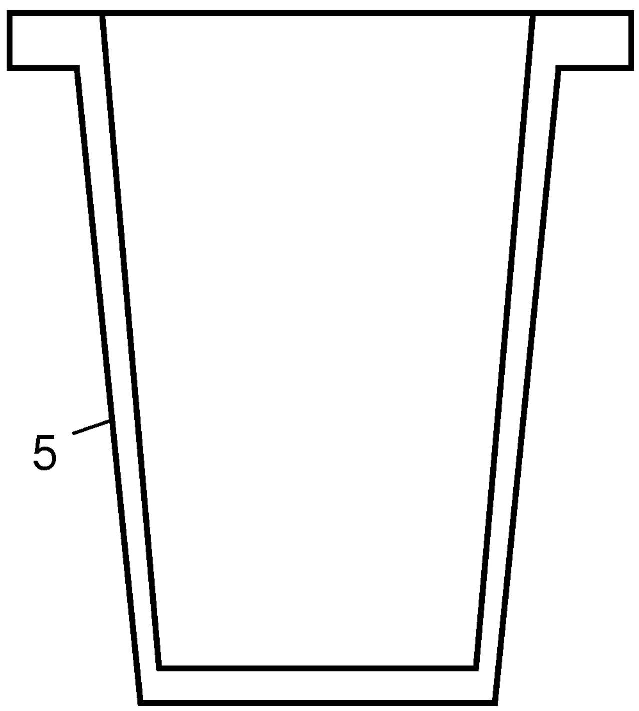
FIG. 6 depicts an embodiment in which the containers are frustoconical in shape.

Aside from how they are coupled to the frame, containers 5 may have various shapes. They may be substantially cylindrical, as shown in FIGS. 1, 2, 3, 4, 5, and 5A. The containers may also have other shapes, for example, the containers 5 may be frustoconical (i.e., tapered) as shown in FIG. 6. A slight taper can facilitate seating of the container in a respective well by minimizing mechanical binding of one surface on the other, without substantially reducing the surface area of the container bottom. Although not depicted, the containers 5 could have any cross-sectional geometry, including but not limited to circular. The particular cross-sectional geometry could be chosen to match the shapes of wells in a particular tray.

Any of the embodiments described above may be used to process tissue samples as follows. A user may wish to expose multiple samples to a liquid reagent, such as a stain. The liquid is deposited in the wells of a tray. The samples are deposited in the containers of the device. The device is then lowered into the tray so that the device engages with the tray. The user may exert slight downward pressure on the device to ensure that all containers seat fully, as described above. Liquid flows through the perforations in the containers and treats the samples.

Because the containers are free to translate vertically, or float, relative to the frame, each container will fully seat within its particular well, even if the wells are not all precisely the same depth. If the containers were rigidly attached to the frame, then lowering the frame onto the tray would only result in fully seating all containers if the tray and its wells happened to be manufactured to perfect or near-perfect specifications, so that wells could mate perfectly with the rigid frame/container assembly. Since this is unlikely, and the manufacturing tolerance of wells results in variation of anywhere from 0.5 to 3 mm difference in well depth, the vertical translation of the containers has the benefit of ensuring that each sample seats in the very bottom of a well. If a user expected that some samples might not reach the bottom of a well, as in a rigid non-floating device, then every well would have to be filled with enough liquid to make sure that even an improperly seated sample was covered. But if the user can be confident that every sample will reach the bottom of a well, then each well need only contain enough liquid to cover a fully seated sample. In this way, a device with floating containers enables a user to use less liquid than an alternative, rigid device with non-floating containers. Use of reagents, especially expensive reagents, may thereby be minimized.

The present devices also allow a user to place samples in the containers and repeatedly expose the samples to a variety of liquids without having to transfer the samples between containers, an important consideration in the handling of delicate samples. Once the samples have been deposited in the containers, the device can be engaged with a first tray having wells containing a first liquid, thereby exposing the samples to the first liquid. Then, the device may be raised, allowing the first liquid to drain back into the wells in the first. The device may then be moved to and mated with a second tray having wells containing a second liquid (such as a wash or another reagent), exposing the samples to that second liquid. This may be repeated as many times as necessary in order to expose samples to any combination of liquids in any order preferred by the user without ever having to remove the samples from the containers. To facilitate this method, the frame may include a handle or a receptacle to receive a handle The containers and frame may be formed from a variety of materials. Polystyrene, especially tissue-culture polystyrene, is widely used in tissue processing, but any material, such as plastics or metals, may be used. Preferably, the material will not adversely react with the liquid to which the samples are to be exposed. It also may be preferable to choose a material for the container that will not stick to the samples. A wide variety of materials may also be used for the frame. In the case that the samples are to be used in immuno-florescence studies without having been removed from the containers, then it may be important to use a material that is transparent to at least the relevant light frequencies for some or all of the device, in order to allow for accurate fluorescence readings. Optically clear material may also facilitate handling of samples and visualization of well seating and liquid submersion during use. Materials may also be chosen to allow for washing, decontamination, and reuse.

Multi-well trays are often packaged with covers designed to tightly fit the tray. In some embodiments, the device may be shaped so that the tray cover fits tightly onto the top of the device. If the user intends to allow the samples to stay exposed to the liquid in the wells for an extended period of time, as in the case of a long incubation, the tray cover can prevent the liquid from evaporating and the samples from drying out.

EXAMPLE

Figure 7:
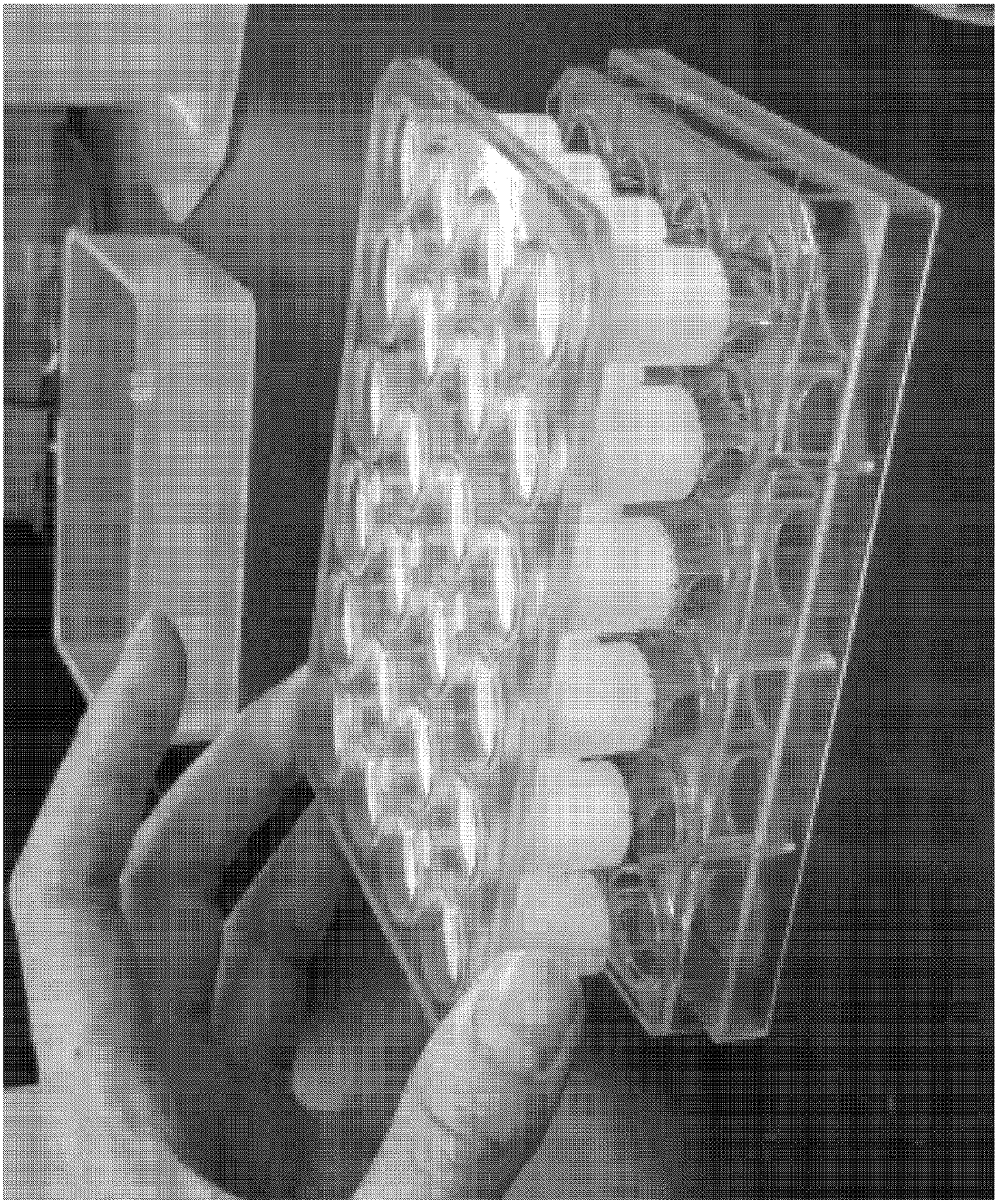
FIG. 7 is a photograph of an example device.

FIG. 7 is a photograph of a particular example of an embodiment the device. The frame comprises two horizontal plates, affixed to each other with metal screws, and spaced apart 0.050 inches (about 1.25 mm) by plastic washers. Both plates define 24 openings. Each opening in the lower plate is occupied by one container. Each container has a shoulder at its top; including the shoulder the container is 0.7 inches (about 17.75 mm) in outer diameter. Just below the shoulder, each container has an outer diameter of 0.605 inches (about 15.25 mm). The openings in the plate have diameters between 0.605 and 0.7 inches. The inner diameter of each container is 0.548 inches (about 14 mm) at the top. Each container defines twelve perforations spaced evenly around its circular base. The perforations form openings partially in the side wall and partially in the base of the container. Each perforation is 0.035 inches (about 0.9 mm) wide at the top.

The invention claimed is:

1. A device comprising:

a frame and a plurality of containers;

wherein:

each container is coupled to the frame such that each container translates vertically with respect to the frame independently of the other containers;

the frame limits the vertical translation range of each container;

each container is perforated to allow liquid penetration;

wherein the frame comprises a first plate that defines a plurality of openings, each opening sized and shaped to receive one of the plurality of containers, and wherein the each container occupies one of the openings;

wherein the frame comprises a second plate affixed parallel to and spaced vertically apart from the first plate; and each container comprises a shoulder that is sized and shaped so that the shoulder cannot pass through the opening occupied by the container; and wherein the shoulder is confined between the first and second plates so that the distance between the plates defines the limited vertical range of vertical translation of each container.

2. The device of claim 1 wherein each container is confined in its horizontal translation relative to the frame.

3. The device of claim 2 wherein each container cannot substantially horizontally translate relative to the frame.

4. The device of claim 1 wherein the vertical translation range of each container is between 0.5 and 3 millimeters.

5. The device of claim 1 wherein: each container comprises two shoulders spaced vertically apart from each other, both shoulders being sized and shaped so that the shoulders cannot pass through the opening occupied by the container; wherein the plate is confined between the two shoulders so that the distance between the shoulders defines the limited vertical range of vertical translation of the container.

6. The device of claim 1 wherein each container is substantially cylindrical.

7. The device of claim 1 wherein each container is substantially frusto-conical.

8. The device of claim 1 wherein each container is perforated along a bottom surface.

9. The device of claim 8 wherein the perforations are holes of at least 0.1 millimeters but no more than 2 millimeters in diameter.

10. The device of claim 1 further comprising a handle.

11. A kit comprising the device of claim 1; and a tray comprising a plurality of wells equal to the number of containers in the device, wherein the wells are sized, shaped, and arranged in the tray to receive the containers, wherein the limited vertical range of each container allows each container to seat fully in the respective well.

12. A tissue processing method using the kit of claim 11 comprising: depositing liquid in at least one of the tray wells; depositing one or more tissue samples in at least one of the containers; and engaging the device with the tray so that the containers seat fully in the wells, thereby exposing the tissue samples to the liquid.

* * * * *